Feb. 11, 1936.   F. J. TWISS   2,030,775

CONTAINER HOLDER

Filed Sept. 17, 1934

Frank Jerome Twiss
INVENTOR

BY Victor J. Evans & Co.
ATTORNEYS

Patented Feb. 11, 1936

2,030,775

UNITED STATES PATENT OFFICE 2,030,775

CONTAINER HOLDER

Frank Jerome Twiss, Swanton, Ohio

Application September 17, 1934, Serial No. 744,409

1 Claim. (Cl. 248—149)

The invention relates to a container holder and more especially to a foldable can and bottle holder.

The primary object of the invention is the provision of a holder of this character, wherein a container, such as a can, bottle or the like, can be conveniently placed therein so that such container will be held erect and prevented from falling over when placed within a liquid tank, such as a cooling tank, vat or the like, the holder being of novel construction and susceptible of adjustment so as to permit varying sizes of containers to be held or placed therein.

Another object of the invention is the provision of a holder of this character, wherein the construction of the same is novel in form and said holder is susceptible of being folded when not in use so as to occupy the least possible space and to be set up for use with dispatch for the holding erect of a container, bottle or the like when at rest.

A further object of the invention is the provision of a holder of this character which is extremely simple in construction, thoroughly reliable and efficient in its purposes, light in weight yet strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 4 is an enlarged vertical sectional view on the line 4—4 of Figure 3.

Similar reference characters indicate corresponding parts throughout the several views in the drawing.

Figure 1:
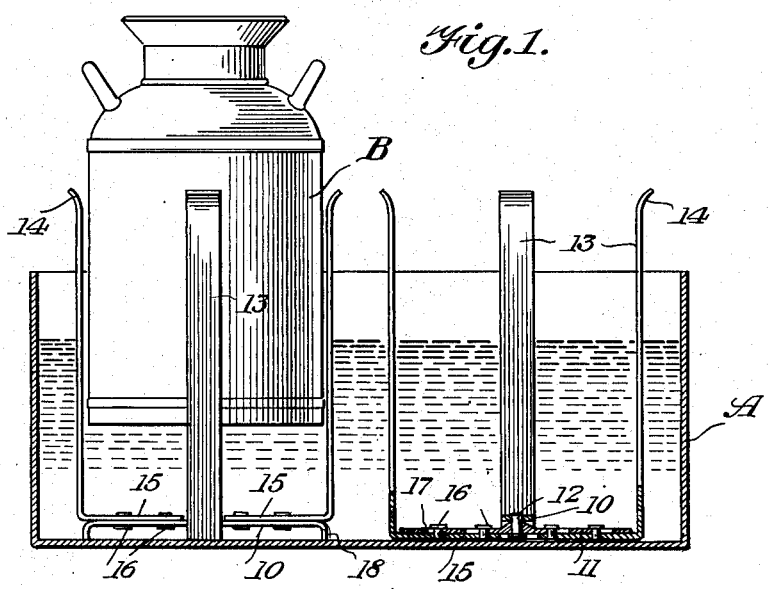
Figure 1 is a vertical longitudinal sectional view through a water cooling tank or vat showing several holders constructed in accordance with the invention arranged therein, one having fitted therein a milk can and the other holder being partly in section.

Referring to the drawing in detail, A designates generally a portion of a water tank or vat ordinarily employed for the cooling of liquid, such as milk, and this tank or vat is of the usual kind. The tank or vat A accommodates therein containers, such as a milk can B, this being of the usual type.

The present invention comprises a holder for the container exampled as a milk can B and includes crossed base pieces or members 10 and 11, respectively, each in the form of a flat strip and these pieces in their crossed relation to each other are connected for swinging movement by a center pivot 12.

Carried by the base pieces 10 and 11 are opposed substantially L-shaped arms 13 having the outwardly curled free ends 14, the arms being upstanding and inherently resilient.

The inner end portions 15 of the arms 13 are bent inwardly at right angles and are adjustably connected with the base pieces 10 and 11, respectively, through the medium of coupling studs 16, these working in slots 17, one series of slots being in the base piece 10 while the companion studs are riveted in the inner end portions 15 of one pair of arms 13 and the other series of slots are contained in the base piece 11, while the rivets are made fast to the inner ends 15 of the other pair of arms and in this manner the pairs of arms opposite each other can be spread apart or brought toward each other for increasing or decreasing the capacity of the holder according to the size of the container to be held therein.

The base piece 10 at its free end is downwardly curled at 18 to form teeth for the setting of the holder level when unfolded or set up for use and placed upon a support, as for example, upon the bottom of the tank A to hold the can B upright therein.

Figure 2:
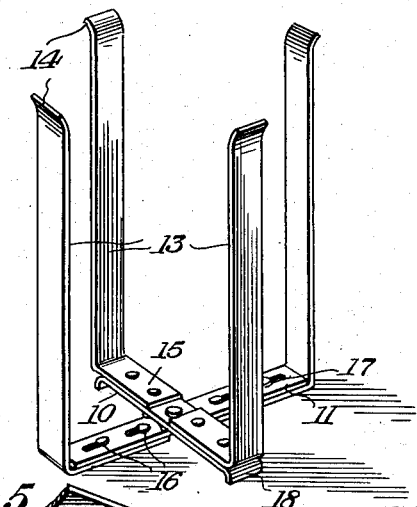
Figure 2 is a perspective view of the holder in set-up condition for the reception of a container.
Figure 3:
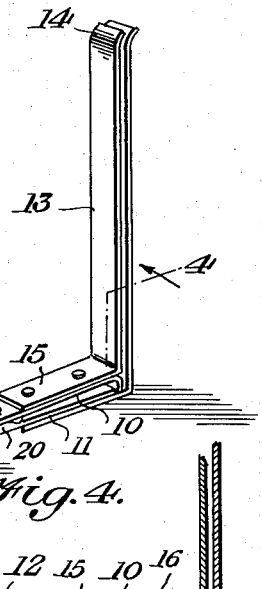
Figure 3 is a perspective view of the holder in its folded condition.
Figure 5:
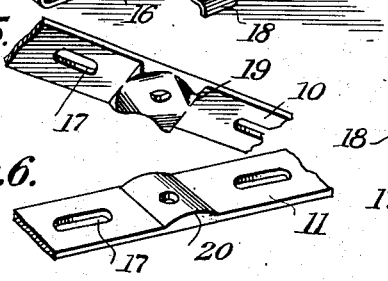
Figure 5 is a fragmentary perspective view of one latching part of the holder.
Figure 6:
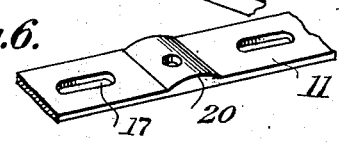
Figure 6 is a view similar to Figure 5 showing the other latching part of the holder.

Formed on the base piece 10 about the pivot 12 are latching lugs 19, while upon the base piece 11 is a keeper rib or protuberance 20 for cooperation with the lugs 19 so that on the unfolding of the arms, as shown in Figure 2, or the folding of such arms, as shown in Figure 3 of the drawing, the crossed pieces 10 and 11 will be frictionally latched to prevent the collapsing or accidental folding of the holder.

What is claimed is:

A holder of the character described comprising a pair of crossed pivotally connected members, interfitted raised portions about the pivotal connection of said members and coacting to frictionally hold the same when swung in parallel relation to each other or at right angles to one another, pairs of arms having inturned lower ends overlapping the said members on opposite sides of the pivotal connection thereof, rivets fixed in the lower inturned ends of said arms and slidably connected with the members for the spreading apart and the bringing together of the said arms with relation to their pairs and downwardly curled ends on the uppermost member for steadying the members when in crossed relation to each other and at rest.

FRANK JEROME TWISS.